Aug. 22, 1950  E. SCHULE  2,519,856
SAFETY TRAILER HITCH
Filed April 11, 1949
FIG. 1.
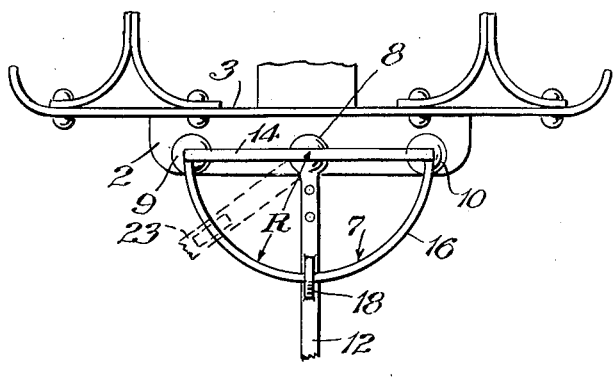
FIG. 4.
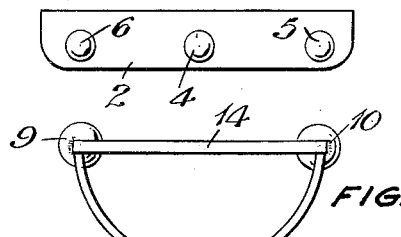
FIG. 6.
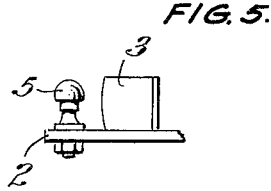
FIG. 5.
FIG. 2.
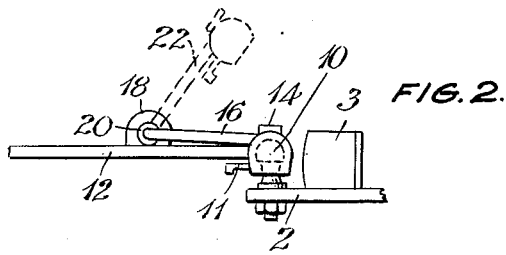
FIG. 3.
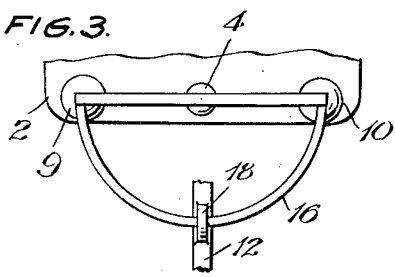
INVENTOR
EARL SCHULE
BY Scott L. Norviel
ATTORNEY Patented Aug. 22, 1950

2,519,856

UNITED STATES PATENT OFFICE 2,519,856

SAFETY TRAILER HITCH

Earl Schule, Phoenix, Ariz.

Application April 11, 1949, Serial No. 86,762

3 Claims. (Cl. 280—33.17)

This invention pertains to safety trailer hitches.

Heretofore ball and socket hitches have been widely used, but due to the nature of the load and to torsion and stresses of load conditions safety chains are always considered necessary and used. These chains are intended to support the draw bar in part and minimize or prevent damage in case the ball and socket fails.

At best the use of chains is a poor compromise and in case of a failure while running rarely prevents damage.

One of the objects of my invention is to provide a ball and socket hitch having a safety element built as part of its structure which has all the flexibility incident to chains, but which is stronger, neater, and more efficient than chains.

Another object is to provide a safety element for use in conjunction with trailer ball hitches which may be easily attached to or detached from the traction vehicle at the same time the hitch is attached, and which will aid in keeping a ball hitch socket from jumping off the hitch ball and will adequately support the trailer tongue or drawbar in case of a failure of the ball and socket hitch while the tractor vehicle and trailer are in motion.

Other objects will appear hereinafter.

I attain the foregoing objects by means of the devices, and their peculiar construction, shown in the accompanying drawings in which—

Figure 1 is a plan view of a hitch incorporating my improvements;

Figure 2, a side elevation thereof;

Figure 3, a plan view showing how the device holds the trailer draw bar after the main ball hitch fails;

Figure 4 is a plan view of the hitch plate;

Figure 5, a side elevation thereof; and

Figure 6, a plan view of the safety link.

Similar numerals refer to similar parts on the several views.

In constructing the safety hitch use is made of conventional ball and socket hitch connectors having a spring loaded latch 11 operative in the rear of the socket adapted to engage under an annular lip found on the under side of the ball.

Numeral 2 indicates a hitch plate which is attached to the bumper 3 of an automotive vehicle and to any of its frame members in any suitable substantial way.

In the center of this plate the ball 4 of a conventional ball and socket hitch is affixed in the usual manner. At equal distances on each side of ball 4, are two similar balls 5 and 6, similarly attached and in alined relation to ball 4.

Socket 8 is secured to the end of trailer tongue 12 so that it will attach to ball 4 in the usual manner to allow for turning and twisting movements, incident to operation of the vehicles.

The safety link 7 is composed of two hitch sockets 9 and 10 joined at the top by a rigid hold down bar 14 so that they are spaced apart twice the distance between balls 4 and 5 or 4 and 6. In other words, these sockets are positioned so they are in mating positions with balls 5 and 6 and will engage on them. Bar 14 is preferably welded to the top of these sockets. A curved rod 16 is then welded to the upper portion of the middle of the back of each of the sockets 9 and 10. This rod extends horizontally rearward from these sockets in a semi-circle having a radius of curvature R which is equal to the distance between ball 4 and either of balls 5 or 6.

A lug 18 is welded or otherwise securely attached to the top of tongue 12, to the rear of socket 8. This lug is pierced transversely providing a hole 20 which is disposed to the rear of the center of ball 4 a distance equal to radius R, and large enough to receive curved rod 16 with an easy or loose sliding and running fit, the edges of the hole are also chamfered to prevent binding. Rod 16 is inserted through this hole before its ends are welded to sockets 9 and 10 and is free to slide through hole 20 as the tongue socket 8 turns on ball 4.

In use the socket 8 is first secured on ball 4. The safety link 7 may be raised as indicated by dotted lines 22 during this part of the hitching. After socket 8 is secured on ball 4 the sockets 9 and 10 are moved to mating position balls 6 and 5. This is readily done by sliding curved rod 16 through hole 20 until the correct radial position is attained. When in mating position the balls 9 and 10 are latched onto sockets 6 and 5 respectively. This brings the heavy connecting or hold down bar 14 over socket 8 so that it is prevented from jumping off ball 4 even if its latch 11 fails. This completes the hitching process.

Thereafter turning movement between the automotive vehicle and the trailer is attained by the sliding of the lug 18 around the rod 16 when the tongue swings, as shown by dotted outline 23, in Figure 1. Twisting movement between the tongue and plate 2 is allowed because of the loose fit of rod 16 in hole 20 in lug 18.

In case the hitch composed of ball 4 and socket 8 fails, or the socket breaks off as shown in Figure 3, the rod 16 of safety link 7 will hold the tongue in approximately normal position, and keep it from dropping to the ground. This safety link can easily be made much stronger and lighter than safety chains of equivalent strength and is easier to attach and detach.

Furthermore, since the link will keep the trailer tongue in substantially normal position, with but little drop, there will be little likelihood of the trailer overturning in case of a failure of the hitch, as stated.

The distance from the ball 4 to the rear edge of plate 2 is sufficient so that in case of a failure of the ball support on the plate the cap 8 will not slide off the plate and drop even after the tongue 12 has moved to the rear as far as the play of bar 16 in hole 29 will permit.

It is to be realized that the failure of the tongue as shown in Figure 3 is an extreme case. In such an event the tongue would, no doubt, drop to some extent. But even in this extreme case the bar 16 would support it, and provide much more rigid control than the safety chains now in common use.

Having now described my improved safety latch and explained its use I wish to be limited only by the claims.

I claim:

1. A safety trailer hitch composed of a hitch plate, three transversely positioned equally spaced hitch balls, a trailer tongue having a hitch socket at its end adapted to engage the middle hitch ball on said hitch plate, and a lug positioned to the rear of said socket having a transverse hole; a safety link having a hold down bar joining two hitch sockets adapted to engage the balls on either side of said central hitch ball, and a rearwardly extending arcuate safety rod joined to said sockets at each end of said hold down bar and adapted to extend through said transverse hole in the lug on said tongue.

2. A safety trailer hitch comprising a hitch plate, a centrally disposed tongue hitch ball thereon, and equally spaced hitch balls on either side thereof; a trailer tongue having a socket at its end adapted to engage said centrally disposed hitch ball; and means for holding said tongue socket on said hitch ball, and to support said tongue independently of the socket at the end thereof, including a transverse hold down bar, sockets at each end thereof adapted to engage the balls on each side of said centrally positioned hitch ball, a rearwardly extending semi-circularly curved rod having its ends connected to said sockets at the ends of said hold down bar, and a lug on said tongue having a hole transversely adapted to receive said curved rod to allow a free running fit therein throughout its curvature.

3. A safety trailer hitch composed of a hitch plate, a centrally disposed hitch ball thereon, and laterally disposed hitch balls at equal distances of each side thereof; a trailer tongue having a hitch socket at its end adapted to engage said centrally disposed hitch ball; and means for supporting said tongue and for securing said tongue socket on said hitch ball, including a safety link composed of a transversely extending hold down bar having sockets at each end disposed to engage on said laterally disposed hitch balls, and a rearwardly curved rod connecting said sockets having a radius of curvature equal to the distance between said centrally dispersed hitch ball, and either of said laterally disposed hitch balls, and a lug having a transverse hole adapted to receive said curved rod with a free running fit, positioned on the upper side of said tongue a distance to the rear of said centrally disposed hitch ball equal to the radius of curvature of said curved rod.

EARL SCHULE.

REFERENCES CITED

The following references are of record in the file of this patent:

UNITED STATES PATENTS

| Number | Name | Date |
|---|---|---|
| 1,294,244 | Doe | Feb. 11, 1919 |
| 1,715,682 | Starks | June 4, 1929 |
| 1,990,484 | Harris | Feb. 12, 1935 |
| 2,464,392 | Heavener | Mar. 15, 1949 |